United States Patent [19]
Woods et al.

[11] Patent Number: 6,132,548
[45] Date of Patent: Oct. 17, 2000

[54] PROCESS FOR THE ASSEMBLY OF GLASS DEVICES SUBJECTED TO HIGH TEMPERATURES, COMPOSITIONS THEREFOR AND NOVEL POLYMERS FOR RHEOLOGICAL CONTROL OF SUCH COMPOSITIONS

[75] Inventors: John G. Woods, Farmington; Maria L. Masterson, Cromwell; Matthew P. Burdzy, South Windsor; Bernard M. Malofsky, Bloomfield, all of Conn.

[73] Assignee: Loctite Corporation, Hartford, Conn.

[21] Appl. No.: 09/222,665

[22] Filed: Dec. 30, 1998

Related U.S. Application Data

[62] Division of application No. 08/723,087, Oct. 1, 1996, Pat. No. 5,902,838.

[51] Int. Cl.$^7$ .......................... B32B 31/28; B32B 31/26; G02F 1/1339
[52] U.S. Cl. .................................. 156/275.5; 156/275.3; 156/272.2; 349/153; 349/182; 349/183; 349/193
[58] Field of Search .................... 349/153, 182, 349/183, 193; 156/272.2, 275.3, 275.5, 275.2; 522/31, 32, 63, 68, 120, 150, 160, 113, 121, 129; 525/242, 312, 245, 255, 260, 261, 313, 495

[56] References Cited

U.S. PATENT DOCUMENTS

| | | | |
|---|---|---|---|
| 2,647,882 | 8/1953 | Evans et al. | 260/47 |
| 4,297,401 | 10/1981 | Chern et al. | 428/1 |
| 4,325,610 | 4/1982 | Inoue | 350/343 |
| 4,543,397 | 9/1985 | Woods et al. | 525/455 |
| 4,857,799 | 8/1989 | Spindt et al. | 313/495 |
| 5,070,117 | 12/1991 | Klemarczyk et al. | 522/31 |
| 5,084,490 | 1/1992 | McArdle et al. | 522/181 |
| 5,087,772 | 2/1992 | Sheehan et al. | 568/804 |
| 5,141,970 | 8/1992 | McArdle et al. | 522/170 |
| 5,216,324 | 6/1993 | Curtin | 313/495 |
| 5,369,200 | 11/1994 | Schadeli et al. | 526/262 |
| 5,547,483 | 8/1996 | Garcia et al. | 65/42 |
| 5,633,411 | 5/1997 | Woods et al. | 568/654 |
| 5,905,559 | 5/1999 | Fujiwara et al. | 349/190 |

FOREIGN PATENT DOCUMENTS

| | | |
|---|---|---|
| 0 229 033 | 7/1987 | European Pat. Off. . |
| 0234450 | 9/1987 | European Pat. Off. . |
| 0 490 588 A1 | 6/1992 | European Pat. Off. . |

OTHER PUBLICATIONS

Chemical Abstract 97:31277 (1982, abstracting JP 56–165141 (12/81).
Chemical Abstract 90:152895 (1979), abstracting Mikato et al. J. Polym. Sci, Polym Lett. Ed., (1979). 17 (2) 79–83.
Chemical Abstract 67:11767 (1967), abstracting D'Alelio et al, J. Polym. Sci. Polym. Chem. Ed. (1967), 5 (6), 1245–64.
M. Kato et al, "Polymerization of Allyl (vinyl Phenyl) Ethers and Reactions of the Resulting Polymers", J. Polym. Sci;, Part A–2,6(11), 2993–3006 (1968).
L. Branst et al, "The Challenge of Flat Panel Display Sealing" ,Semiconductor International, Jan. 1996, pp. 109–112.
Chris Curtin, "The Field Emission Display: A New Flat Panel Technoloy" , IDEC '91, pp. 12–15, 8/1991.
Frechet el al, "Imaging Processes Based on Side–Chain Modification of Polymers" , ACS Symp. Ser. (1989), pp. 155–171.
Chemical Abstract 101:46315, abstracting JP 59–034532 (2/84).
"The Grand Alliance in Flat Panels," Business Week, Aug. 28, 1995, p. 73.
Chemical Abstracts, vol. 78, no. 22, 4 Jun. 1973, abstract no. 137333r and JP 72 043 192 A.
Database WPI, Section Ch., Week 9242, Derwent Publication Ltd., Class A13, AN 92–343589 & JP 04 246 651A.

*Primary Examiner*—Susan W. Berman
*Attorney, Agent, or Firm*—Vidas, Arrett & Steinkraus, P.A.

[57] ABSTRACT

Cationically curable adhesives and sealants with increased viscosities and improved rheological control and good storage stability are prepared using a cationically curable monomer and a thickening polymer which is the alkylation reaction product of poly(4-hydroxystyrene) or poly(2-hydroxystyrene) with a compound RX where R is allyl, methallyl, crotyl or prenyl and X is Cl, Br or I. The cationically curable monomer suitably includes at least one alkenyloxystyrene monomer. Such thickened adhesives are useful as edge sealants for flat panel display devices. A-stage curing of the adhesive with UV irradiation allows for near ambient temperature fixturing of the device assemblies and B-stage thermal curing of the adhesive can be conducted at much lower temperatures than are needed for glass frit sealants. The B-stage cured products have thermal resistance, outgassing and substrate adhesion properties adequate for flat panel display devices.

9 Claims, 1 Drawing Sheet

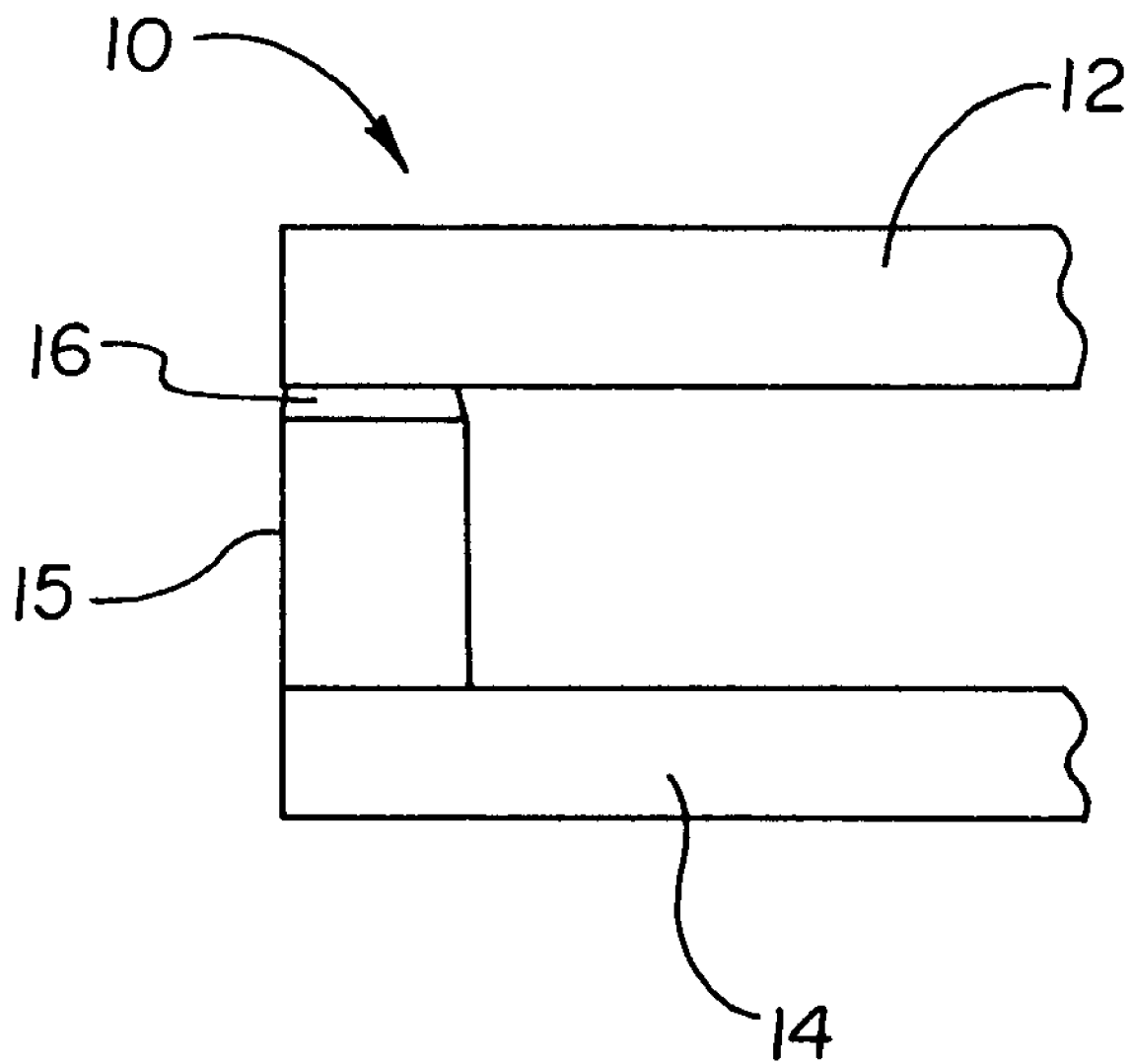

PROCESS FOR THE ASSEMBLY OF GLASS DEVICES SUBJECTED TO HIGH TEMPERATURES, COMPOSITIONS THEREFOR AND NOVEL POLYMERS FOR RHEOLOGICAL CONTROL OF SUCH COMPOSITIONS

This application is a division of U.S. application 08/723,087, filed Oct. 1, 1996 now U.S. Pat. No. 5,902,838, issued May 11, 1999.

FIELD OF THE INVENTION

The present invention pertains to sealed flat panel display devices, to novel edge sealant compositions therefor and to novel polymers used in such compositions.

BACKGROUND OF THE INVENTION

A variety of flat panel display devices are known including plasma and field emission display devices. references describing such devices include U.S. Pat. No. 4,857,799; U.S. Pat. No. 5,216,324; L. Branst and F. Pothoven, *Semiconductor International,* January 1996, p. 109; "The Grand Alliance in Flat Panels," *Business Week,* Aug. 28, 1995, p. 73; and C. Curtin, "The Field Emission Display: A New Flat Panel Technology," *IDEC* '91 pp. 12–15 (8/1991). The construction and operation of such devices vary but in general it is necessary to provide a high vacuum in a sealed interior volume between a base plate and a spaced face plate. The interior volume is defined and the vacuum maintained by an edge sealant which bonds the two plates together in spaced relationship. Current methods of vacuum sealing of flat panel displays require the use of solder glass frits as edge sealants. Such frits require long heating periods at 450–600° C. to melt and fuse the frit with the glass panels of the display. There are, however, several problems associated with this method including long processing times, thermal degradation of critical components during the heat sealing operation, difficulty in maintaining micron size alignment tolerances under high heat conditions and compatibility of the frits with display glass.

While there are a number of alternative edge sealing techniques proposed, it is still desirable to obtain a commercially satisfactory alternative to the glass frit sealant. In particular, it is desirable to obtain a sealant which can produce a fixtured assembly at low temperature, which can withstand high temperature bake out, and which after bakeout, pumpout and closure of the pumpout port, can maintain a vacuum seal at pressures in the range of from about $10^{-3}$ Torr to about $10^{-9}$ Torr, depending on the specific application, without outgassing.

Unmodified alkenyloxystyrene adhesives are disclosed in U.S. Pat. Nos. 5,084,490 and 5,141,970 (McArdle et al) and in U.S. Pat. Nos. 4,543,397 and 4,732,956 (Woods et al). Poly(4-allyloxystyrene) and somewhat related polymers are described in Frechet, et al, "Imaging processes based on side-chain Modification of Polymers", *ACS Symp. Ser.* (1989), 381 (*Eff. Radiat. High-Technol. Polym.*), 155–71, and in *Chem. Abst.* 101:46315 (1984); 97:31277 (1982); 90:152895 (1979); 69:107140 (1968); and 67:11767 (1967). In all of these references the adhesives and other polymer systems are unfilled.

It is known that certain alkenyloxystyrene monomers, such as 4-allyloxystyrene, can be cationically photocured to produce a solid crosslinked polymer, which upon thermal baking will B-stage cure by a Claisen Rearrangement reaction to produce a polymeric material which has very high decomposition and glass transition temperatures. However, such monomers, and the adhesive compositions derived from these monomers, generally have very low viscosities compared to conventional adhesives and sealants. The low viscosity characteristics of these materials sometimes present processing difficulties related to adhesive "run-off" during the assembly of the components to be bonded together. In such circumstances, the adhesive bead, applied to one surface, flows beyond the intended bond or seal line area. This problem is particularly acute in those applications where assembly of the two substrates takes a relatively long time to complete after the application of the adhesive, such as is the case in the assembly of flat panel displays where precise alignment of the two substrates is a time consuming operation. The results of adhesive run-off include joint starvation with subsequent seal or adhesive failure, adhesive contamination and failure of contaminated components of the device to be sealed or bonded and increased processing costs related to adhesive wastage and clean-up.

A well known technique for overcoming such rheological problems with other monomer-based adhesive and sealant systems is to dissolve polymeric additives in the monomer composition, thus increasing the viscosity and minimizing or preventing the adhesive run-off during assembly. However, it has been found that conventional polymeric thickeners such as polystyrene do not possess adequate thermal resistance properties to be useful in alkenyloxystyrene compositions intended for applications with high-temperature and/or high-vacuum, low-outgassing requirements. Furthermore, as illustrated in the examples below, the corresponding polymers prepared by the conventional polymerization of 4-allyloxystyrene monomer have been found to be unsuitable due either to chemical instability (cationically polymerized polymer, see Example 4, composition C) or insolubility (free radically polymerized polymer, see Example 3).

Polymerization of 4-allyloxystyrene by means of free radical initiators is reported in J. Frechet et al, in *ACS Symp. Ser.* 381 (Eff. Radiat. High-Technol. Polym.), 155–71, (1989), and in *Chem. Abst.,* 69:107140 (1968) abstracting M. Kato et al, *J. Polym. Sci., Part A-1,* 6(11), 2993–3006 (1968). JP 59034532 (abstract), reportedly describes an anionically polymerized 4-allyloxystyrene polymer. Such material would be expected to inhibit cationic curing and therefore would be unsuitable as thickeners for cationically curable compositions.

SUMMARY OF THE INVENTION

The present invention addresses the need to provide alkenyloxystyrene adhesives and sealants with increased viscosities and improved rheological control compared to the unfilled systems. The work is specifically directed to compositions which are useful for the vacuum sealing of flat panel displays utilizing field emission cathodes, although the invention has application to other types of flat panel display devices and to many other adhesive, sealant, coating and molding compound problems.

In one aspect the invention is a composition comprising:

a) a monomer component comprising at least one cationically curable monomer and b) a polymer component comprising at least one member selected from the group consisting of polymers of the formulae:

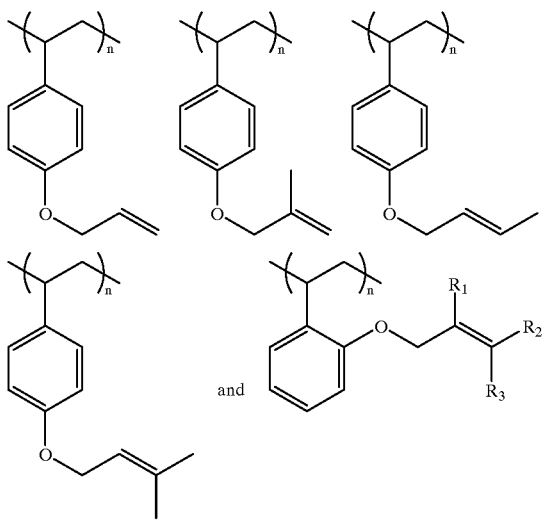

where n is an integer and

R$_1$, R$_2$ and R$_3$ are H; or

R$_1$ is methyl and R$_2$ and R$_3$ are H; or

R$_1$ and R$_2$, are H and R$_3$ is methyl; or

R$_1$ is H and R$_2$ and R$_3$ are methyl, the polymer component being dissolved in the monomer component and the composition being storage-stable. Particularly preferred compositions employ in the monomer component (a) a member selected from the group consisting of 4-allyloxystyrene, 4-methallyloxystyrene, 4-crotyloxystyrene, 4-prenyloxystyrene (i.e., 4-(3-methyl-2-butenyloxy)styrene), 2-allyloxystyrene, 2-methallyloxystyrene, 2-crotyloxystyrene or 2-prenyloxystyrene. Such compositions, thermally cured to a B-stage crosslinked polymer in the manner described herein, are capable of bonding and maintaining seal in flat panel display devices having internal pressures as low as 10$^{-8}$ Torr.

Another aspect of the invention is a process for producing a bonded assembly from two substrate components, at least one of the substrate components being transparent to UV light, the process comprising:

applying a bead of a curable composition of the invention about the perimeter of a predetermined area on a first of said two substrate components, applying the second of said two substrate components to said bead to produce a joined assembly having a volume enclosed by said two substrates and said bead;

irradiating the joined assembly with UV light through said at least one transparent substrate component to polymerize said at least one monomer, thereby producing a fixtured assembly of the two substrate components; and subsequently, heating the fixtured assembly to a temperature and for a time sufficient to cause rearrangement of the polymerized composition to a colored B-stage crosslinked polymer.

Novel acid free polymers useful in the compositions as defined above comprise still another aspect of the invention. A still further aspect of the invention are flat panel display devices produced by the method of the invention and/or by B-stage curing of compositions of the invention. These and other aspects of the invention are set forth in greater detail in the accompanying description and claims.

DESCRIPTION OF THE FIGURE

The figure is a partial side sectional view of a flat panel display device of the invention.

DETAILED DESCRIPTION OF THE INVENTION

The characteristics which make the inventive alkenyloxystyrene adhesives useful for the production of flat panel displays include high decomposition and glass transition temperatures, low outgassing, rapid photocure and good adhesive strength. The adhesives of the invention can be easily used in preparing flat panel display devices because it has been found that the monomer formulations can be thickened by dissolving acid-free alkenyloxystyrene polymers which are soluble in the monomers. Such polymers can be prepared by alkylation of poly(4-hydroxystyrene) with an alkenyl functional alkylating agent such as allyl bromide, methallyl bromide, crotyl bromide or prenyl bromide.

Polymers so-prepared have the following characteristics:

1. they are soluble in alkenyloxystyrene monomers at a sufficiently high concentration to increase the viscosity of the composition;
2. they do not result in a lowering of the decomposition temperature of the adhesive nor contribute to outgassing during cure or in subsequent use;
3. they are chemically and physically stable in the uncured monomer blend; and
4. they do not interfere with nor inhibit the cationic cure mechanism of the alkenyloxystyrene composition.

The compositions of the invention include a cationically curable monomer component in addition to the polymer component. The monomer component suitably contains one or more of 4-allyloxystyrene, 4-methallyloxystyrene, 4-crotyloxystyrene, 4-prenyloxystyrene, 2-allyloxystyrene, 2-methallyloxystyrene, 2-crotyloxystyrene or 2-prenyloxystyrene. 4-Allyloxystyrene is preferred. A particularly suitable method of preparation of 4-allyloxystyrene utilizes saponification and alkylation of 4-acetoxystyrene, as described in U.S. Pat. No. 5,633,411, filed May 28, 1996, incorporated herein by reference. A monomer having two or more cationically curable carbon-carbon double bonds may optionally also be employed in the monomer component of the composition at levels of from about 1 to about 50%, preferably from about 10 to about 40% by weight of the monomer component. Suitable such monomers include commercially available divinyl ether monomers, distyryloxy compounds, 2,2-bis(3-allyloxy-4-vinyloxyethoxyphenyl) propane and other monomers disclosed in U.S. Pat. No. 5,070,117 and the "matrix" monomers described in U.S. Pat. No. 5,141,970, both of which patents are incorporated herein by reference.

The monomer/polymer ratio may be widely varied depending on the particular requirements of the specific application to which the composition will be put. Suitable ratios of monomer to polymer range from about 99:1 to about 5:95 on a parts by weight basis. For flat panel display applications a monomer to polymer ratio of from 90:10 to 50:50 is more preferred.

Where photocuring is desired for the A-stage cure of the composition, a cationic photoinitiator which does not initiate substantial polymerization of the allylic double bond of the monomer component may also be included in the composition. Suitable such photoinitiators and their effective amounts are well known. Typically they are employed at a level within the range of 0.1–10% by weight of the composition, preferably 1–5% by weight. Generally such photoinitiators are iodonium, sulfonium, pyrylium, thiopyrylium or diazonium salts of a complex halogenide. Examples include di-p-tolyl iodonium hexafluorophosphate, diphenyl iodonium hexafluoroarsenate, UVE 1014™ a sulfonium salt photoinitiator sold by General Electric, and Cyracure UVI-6974, a cationic photoinitiator sold by Union Carbide Corp.

The alkenyloxystyrene adhesive compositions address the problems of glass frit edge sealants for flat panel display devices which have been described above. They fixture on exposure to UV light following a few seconds irradiation at low to moderate light intensities (A-stage cure). This provides a means of excellent control of the alignment process and eliminates the concerns regarding maintaining alignment tolerances during the subsequent heat cure cycle (B-stage cure). The typical B-stage conditions involve heating the UV irradiated device at 150–250° C. for periods of approximately 1–3 hours. These conditions are considerably more favorable than the conditions necessary to fuse glass frit, and thus they reduce the risk of thermal damage to critical device components during the sealing process. The cured alkenyloxystyrene compositions have excellent adhesion to glass, provide adequate vacuum sealing of display devices and maintain mechanical and chemical stability throughout the high temperature vacuum bake that is required to remove traces of contaminant gasses after the sealing is complete.

The polymer modification synthesis of poly(4-allyloxystyrene) involving the alkylation reaction of poly(4-hydroxystyrene) with allyl bromide in the presence of excess potassium carbonate is illustrated in the reaction equation 1.

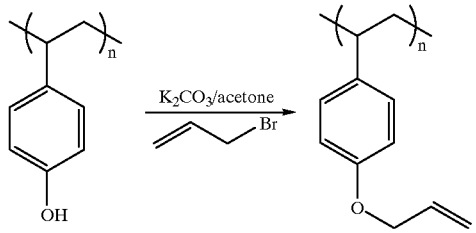

In addition to having good solubility in the alkenyloxystyrene monomer component of the inventive adhesives, the polymers of the present invention are capable of undergoing B-stage curing via a Claisen Rearrangement reaction at elevated temperatures which generates allyl substituted phenolic side chain structure on the preexisting polymer. The resulting allyl functional phenolic polymer will promptly undergo acid catalyzed electrophilic addition reaction between the allylic group and a phenol at the remaining available ortho or para position thereof yielding a colored polymer which is much more highly crosslinked. Thus, the B-stage chemistry of the polymer filled compositions is similar to that of the unfilled systems and the cured products have similar good thermal resistance properties comparable to the cured unfilled systems.

In addition to poly(4-allyloxystyrene), several similarly prepared polymers, not previously reported, are also useful in the inventive compositions. These include poly(4-methallyloxystyrene) (2), poly(4-crotyloxystyrene) (3) and poly(4-prenyloxystyrene) (4).

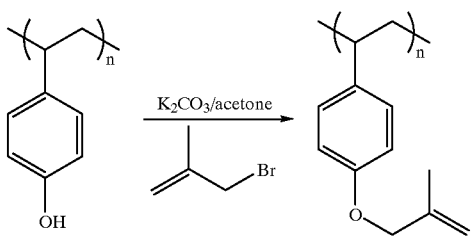

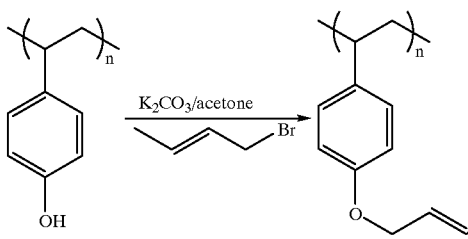

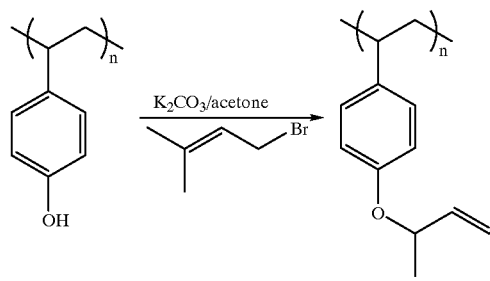

The syntheses of these materials are performed under similar conditions to that described in example 1, but using methallyl bromide for polymer 2, crotyl bromide for polymer 3 and prenyl bromide for polymer 4. Corresponding chloride or iodide compounds may be employed in place of the indicated bromides. It is also possible to obtain useful 2-alkenoxy substituted polymers by the alkylation of poly (2-hydroxystyrene) with the various halides, which are indicated by the generic structures in reaction equation (5).

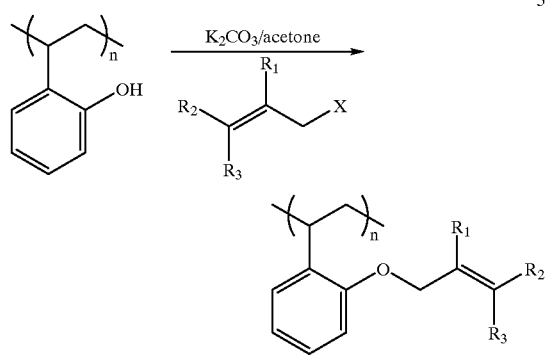

$R_1, R_2, R_3 = H$ (allyloxy)
$R_1 = Me; R_2, R_3 = H$ (methallyloxy)
$R_1, R_2 = H; R_3 = Me$ (crotyloxy)
$R_1 = H; R_2, R_3 = Me$ (prenyloxy)
$X = Cl, Br, I$ Referring to the Figure there is shown therein a fragment of a flat panel display device 10 which includes a face plate 12, a base plate 14 with side wall 15 bonded thereto or integrally formed thereon, and a cured adhesive layer 16 sealingly bonding the face plate and base plate together along the upper edge of sidewall 15. Details of the internal structure of the device are not shown as they are conventional and can vary significantly depending on the particular device. The device 10 may be a plasma display, a field emission display or any other conventional type of flat panel display device. The adhesive layer 16, however, is a B-stage cured alkenyloxystyrene adhesive composition as described herein. The device 10 may be prepared by assembling the face and base plates in aligned spaced relationship with a layer of an adhesive composition of the invention applied to the upper surface of the sidewall 15 so as to contact and seal the interface between both plates. The device is provided with a sealable pumpout port, not shown, of conventional design. UV cure of the adhesive while the alignment is maintained, using conventional photocuring conditions, produces an aligned bonded assembly which can then be removed from the alignment fixturing. The assembly is subsequently placed in an oven, suitably at 150–250° C. for 1–3 hours, to B-stage cure the adhesive layer and to bake off volatile contaminants. The interior is evacuated via the pumpout port during the bake cycle, after which the pumpout port is sealed in conventional manner.

In an equivalent alternative embodiment, the sidewall may be formed as part of the face plate, with the adhesive bead being applied between the lower edge of the sidewall and the base plate. In a still further embodiment the sidewall may be joined to one or the other of the face and base plates using the adhesive of the invention, cured to at least an A-stage cure, and then the other of the face and base plate bonded to the resulting plate/sidewall assembly in the manner described above.

The compositions of the invention, particularly at higher polymer/monomer ratios, may also be employed as curable gasket edge sealants for liquid crystal display devices.

In some applications thermal A-stage curing may be suitable, typically by heating the composition to a lower temperature and/or for a shorter period of time than is required for B-stage curing. Suitable thermal catalysts for such applications are especially diazonium salts, although any of the cationic photoinitiators identified above may be also employed as thermal initiators of cationic polymerization under some circumstances. It is also possible in some applications of the inventive adhesive to eliminate the separate A-stage curing step, producing a joined assembly with a composition of the invention and then thermally curing the composition directly to the B-stage.

While less preferred than the compositions previously described, curable adhesive formulations of a cationically curable monomer component and the alkenyloxy etherified phenolic polymers described herein may also usefully be prepared in which the monomer component contains no allyloxyoxystyrene monomer, especially where the polymer comprises the majority of the monomer/polymer composition. Examples of such cationically curable monomers which do not have allyloxyoxystyrene functionality are divinyl ether compounds, for instance divinyl ethers of polyalkylene glycols, and distyryloxy compounds. Because of the ability of the polymers employed in the inventive compositions to B-stage cure as described above, such compositions can have improved thermal resistance properties compared to formulations of the same monomers filled with conventional polymeric thickeners.

The invention is illustrated by the following non-limiting examples.

EXAMPLES

Example 1

Synthesis of poly(4-allyloxystyrene) from poly(4-hydroxystyrene)

To a 500 ml 3-necked flask equipped with a reflux condenser, mechanical stirrer and addition funnel was added 100 mls acetone. Potassium carbonate (83.4 g) was added portionwise to the stirred reactor followed by poly(4-hydroxystyrene) (25.2 g; 0.21 moles of repeat units; weight average molecular weight (Mw)=9,700; molecular weight distribution (MWD)=2.4, supplied by Hoechst Celanese). After stirring for an additional 15 minutes, a solution of allyl bromide (26.75 g; 0.22 moles) was added dropwise over 30 minutes and the mixture heated under reflux for 4 hours. On cooling the reaction mixture was filtered and the solvent removed under reduced pressure. Water (70 mls) was added to the residue and the mixture extracted with dichloromethane (1×70 mls and 1×30 mls). The combined dichloromethane extracts were dried over sodium sulfate, filtered and the solution concentrated by partial distillation of the solvent under reduced pressure. The residue (28.17 g) was transferred to a crystallizing dish and heated under vacuum (40° C., 76 mm Hg) to constant weight to give poly(4-allyloxystyrene) as a faint yellow colored solid. (19.12 g, 57% yield). The structure of the polymer was confirmed by spectroscopic and chromatographic analysis $^1$H NMR (CDCl$_3$): δ 6.6, m, 4H, aromatic protons; δ 6.1, m, 1H, —CH═CH$_2$; δ 5.1–5.5, m, 2H, —CH═CH$_2$; δ 4.5, m, 2H, —OCH$_2$; 1.1–1.9, m, 3H, —CH$_2$CH.

IR (KBr disc): 1647 cm$^{-1}$, 926 cm$^{-1}$, allyl group.

GPC (PS standards, PL gel): Mw=13,200; MWD=3.0.

Example 2

(Comparative Example) Synthesis of poly(4-allyloxystyrene) by Cationic Polymerization of 4-allyloxystyrene 4-Allyloxystyrene (0.860 g) and cationic photocatalyst Cyracure UVI 6974 (Union Carbide) (0.017 g) were blended together to give an ultra-violet (UV) light sensitive solution. Several drops of the solution were placed on a glass plate to form a thin liquid film of approximately 0.25 mm in thickness. The supported monomer film solution was exposed to UV light from an Oriel UV mercury light projector (model 87331) for 20 seconds (incident light intensity=30 mW/cm$^2$ at 365 nm) during which time the liquid monomer polymerized to give a dry, solid film of poly(4-allyloxystyrene) in quantitative yield. The IR spectrum of the polymer was identical to that of the polymer produced by the method of example 1, thus confirming the polymer structure. Both the molecular weight and distribution were, however, significantly higher for the polymer produced by this method.

GPC (PS standards, PL gel): M$_w$=88,800; MWD=3.8

Example 3

(Comparative Example) Synthesis of poly(4-allyloxystyrene) by Free Radical Polymerization of 4-allyloxystyrene 4-Allyloxystyrene (0.469 g) and free radical initiator 2,2'-azobisisobutyronitrile (0.003 g, Aldrich Chemical Co.) were blended together in a glass tube to give a thermally sensitive polymerizable solution. The head space in the tube was purged with nitrogen and sealed. The tube heated at 100° C. for 0.5 hours and cooled. This provided a soft rubber-like polymer that was insoluble in 4-allyloxystyrene and several common organic solvents including acetone and tetrahydrofuran. The polymer readily swelled in solvent indicating that a crosslinking polymerization reaction had occurred.

Example 4

Preparation of UV Photocurable Adhesives

UV light sensitive photocurable compositions were prepared by blending together the materials listed below.

Composition A (monomer blend):

4-allyloxystyrene 15.010 g 2,2-bis(3-allyl-4-vinyloxyethoxyphenyl)propane (per U.S. Pat. No. 5,070,117) 5.020 g Cationic photocatalyst Cyracure UVI-6974 (Union Carbide Corp.) 0.282 g This composition is a relatively low viscosity liquid with flow characteristics similar to water. On exposure to UV light the composition rapidly formed an insoluble, hard, crosslinked polymer. The estimated tack-free cure time of a thin film of this adhesive is 5 seconds at a UV light intensity of 30 mW/cm$^2$ (measured at 365 nm).

Composition B (invention formulation):

monomer blend (composition A) 1.010 g poly(4-allyloxystyrene) (synthesized by the method of example 1) 0.330 g The polymer readily dissolved in the monomer to form a slightly hazy solution. The solution has a relatively high viscosity compared to composition A as evidenced by its greater resistance to flow. The solution is stable with respect to dark thermal polymerization and showed no signs of deterioration on storage at room temperature for 4 weeks. On exposure to UV light the composition rapidly formed an insoluble, crosslinked polymer which was softer and more flexible than the cured material of composition A. The estimated tack-free cure time of a thin film of this adhesive is 10 seconds at a UV light intensity of 30 mW/cm$^2$ (measured at 365 nm).

Composition C (comparative formulation):

4-allyloxystyrene 0.223 g poly(4-allyloxystyrene) (synthesized by the method of example 2) 0.077 g The monomer instantly polymerized following the addition of the polymer. The polymerization reaction was so rapid that complete solution of the polymer was not achieved. This result demonstrates that polymer produced by the method of example 2 is unsuitable for use in compositions containing 4-allyloxystyrene monomers.

Composition D (comparative formulation):

monomer blend (composition A) 9.00 g poly(styrene), Mw ~45,000 (Aldrich) 3.00 g

The polystyrene was dissolved in the monomer blend by stirring at 30° C. for 3 hours. A slightly hazy solution was obtained with flow characteristics that were similar to composition B. On exposure to UV light the composition gave an insoluble crosslinked polymer.

Example 5

Thermal Analysis of Poly(4-allyloxystyrene) and Various UV Cured Compositions

The thermal properties of poly(4-allyloxystyrene) prepared as described in Example 1 and the UV cured compositions A, B and D of Example 4 were determined by dynamic thermal gravimetric analysis (TGA) in which the weight loss was recorded as a function of temperature. The analyses were conducted under a nitrogen atmosphere at a heating rate of 10° C./minute. The thermal resistance properties were defined in terms of the temperature of the onset of degradation ($T_d$) (i.e. the temperature at which the polymer begins to loose weight as determined by step analysis of weight loss temperature profile) and the weight loss measured at 400° C. The results are presented in Table 1.

TABLE 1

TG analyses of poly(4-allyloxystyrene) (PAOS) and UV cured compositions with and without added PAOS and poly(styrene) (PS)

| Composition | $T_d$ (° C.) | Weight loss at 400° C. (%) |
|---|---|---|
| poly(4-allyloxystyrene) (PAOS) (example 1) | 431 | 2 |
| UV cured monomer blend without PAOS (composition A, example 4) | 430 | 2 |
| UV cured monomer blend with PAOS (composition B, example 4) | 431 | 4 |
| UV cured monomer blend with PS (composition D, example 4) | 305 | 14 |

The results demonstrate that high decomposition temperatures and low weight losses associated with cationically polymerized 4-allyloxystyrene monomers are not significantly reduced when poly(4-allyloxystyrene) is used to control the rheology of the composition. In contrast, the conventional polymeric modifier, polystyrene, results in a significant reduction in the onset of degradation temperature of the composition and a corresponding large weight loss at 400° C. The outgassing associated with this latter composition makes it unsuitable for the sealing of flat panel FED displays.

In the report by J. Frechet et al, *ACS Symp. Ser.* 381, 155, (1989), it is stated that the thermal degradation of poly(4-allyloxystyrene) resembles that of poly(4-hydroxystyrene). Unexpectedly it has been found that the thermal degradation of poly(4-allyloxystyrene) used in this work occurs at a significantly higher temperature than that of the starting polymer (see Table 2).

TABLE 2

TG analyses of poly(4-hydroxystyrene) and poly(4-allyloxystyrene) (PAOS)

| Composition | $T_d$ (° C.) | Weight loss at 400° C. (%) |
|---|---|---|
| poly(4-hydroxystyrene) (literature report) | 325 | 75 |
| poly(4-hydroxystyrene) (example 1) | 374 | 50 |
| poly(4-allyloxystyrene) (PAOS) (example 1) | 431 | 2 |

While this invention may be embodied in many different forms, there are shown in the drawings and described in detail herein specific preferred embodiments of the invention. The present disclosure is an exemplification of the principals of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A process for producing a bonded assembly from two substrate components, at least one of the substrate components being transparent to UV light, the process comprising:

applying a composition comprising:

a) a monomer component comprising at least one member selected from the group consisting of 4-allyloxystyrene, 4-methallyloxystyrene, 4-crotyloxystyrene, 4-prenyloxystyrene, 2-allyloxystyrene, 2-methallyloxystyrene, 2-crotyloxystyrene or 2-prenyloxystyrene, b) a substantially linear polymer component having a formula consisting essentially of repeat units selected from the group consisting of

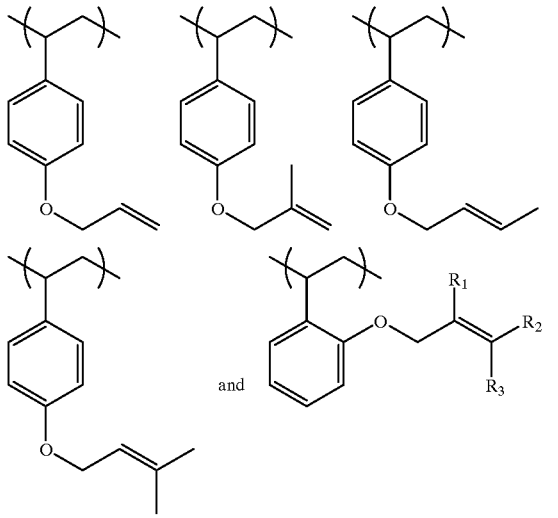

where
R$_2$, R$_2$ and R$_3$ are H; or
R$_1$ is methyl and R$_2$ and R$_3$ are H; or
R$_1$ and R$_2$, are H and R$_3$ is methyl; or
R$_1$ is H and R$_2$ and R$_3$ are methyl, and c) a cationic photoinitiator,
the polymer component being dissolved in the monomer component and the composition being storage-stable, to at least one of the substrate components;
joining the two substrate components in desired alignment to produce a joined assembly;
irradiating the joined assembly with UV light through said at least one transparent substrate component to polymerize said monomer component, thereby producing a fixtured assembly of the two substrate components; and subsequently,
heating the fixtured assembly to a temperature and for a time sufficient to cause rearrangement of the polymerized composition to a colored B-stage crosslinked polymer.

2. A method as in claim 1 wherein said joined assembly is formed with a gap between the two substrate components, the composition being applied so as to form a perimeter around at least a portion of the joined assembly and thereby define an enclosed volume between said two substrate components, and wherein said enclosed volume is evacuated and sealed between said irradiation step and said heating step.

3. A method as in claim 2 wherein said bonded assembly is a flat panel display device.

4. A flat panel display device having a face plate and a base plate separated by a sealed and evacuated gap, the gap being sealed by B-stage curing of a composition comprising:
a) a monomer component comprising at least one member selected from the group consisting of 4-allyloxystyrene, 4-methallyloxystyrene, 4-crotyloxystyrene 4-prenyloxystyrene, 2-allyloxystyrene, 2-methallyloxystyrene, 2-crotyloxystyrene or 2-prenyloxystyrene, and b) a substantially linear polymer component having a formula consisting essentially of repeat units selected from the group consisting of

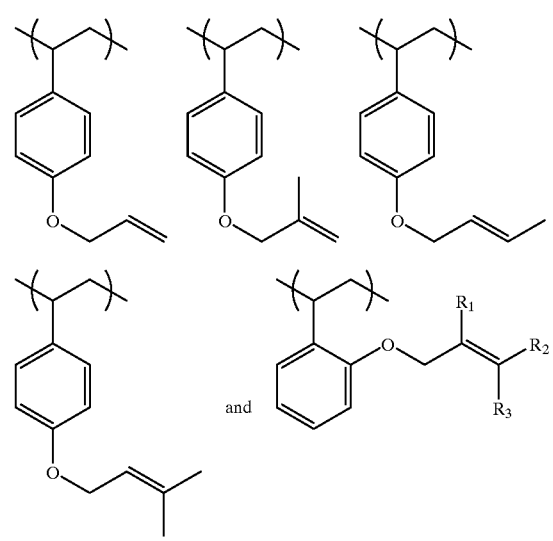

where
R$_1$, R$_2$ and R$_3$ are H; or
R$_1$ is methyl and R$_2$ and R$_3$ are H; or
R$_1$ and R$_2$, are H and R$_3$ is methyl; or
R$_1$ is H and R$_2$ and R$_3$ are methyl, the polymer component being dissolved in the monomer component and the composition being storage-stable.

5. A bonding process comprising:
a) applying a composition comprising a storage-stable solution of:
at least one cationically polymerizable monomer and a polymeric thickener of the formula:

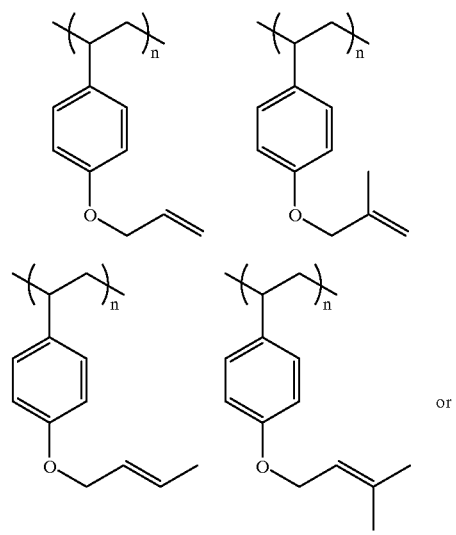

or

-continued

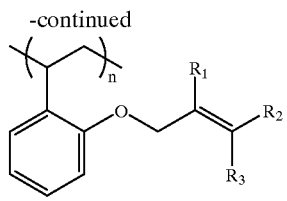

where n is an integer and
$R_1$, $R_2$ and $R_3$ are H; or
$R_1$ is methyl and $R_2$ and $R_3$ are H; or
$R_1$ and $R_2$, are H and $R_3$ is methyl; or
$R_1$ is H and $R_2$ and $R_3$ are methyl,
the composition further comprising a thermal or photo activated cationic initiator, to a first substrate, b) contacting a second substrate to the composition on the first substrate to produce a joined assembly, and subsequently c) thermally curing the composition to a B-stage polymer.

6. A bonding process as in claim 5 wherein the composition is cured to an A-stage polymer by cationic polymerization of the cationic monomer in a first curing stage, and then, in a second curing stage is thermally cured to said B-stage polymer.

7. A bonding process as in claim 6 wherein the composition is cured to said A-stage polymer by cationic thermal curing of the cationic monomer at a first time and temperature in said first curing stage, and then is cured to said B-stage polymer in said second curing stage by heating the composition to a higher temperature and/or for a longer period of time than said first curing stage.

8. A bonding process as in claim 6 wherein the joined assembly is held together with a fixturing apparatus during said first curing stage, said fixturing apparatus being removed between said first and second curing stages.

9. A bonding process as in claim 6 wherein said composition is cured to said A-stage polymer by cationic photopolymerization of the cationically polymerizable monomer.

* * * * *